(No Model.)
J. W. SMITH.
Apparatus for Preparing Wheat for Grinding.
No. 242,387. Patented May 31, 1881.
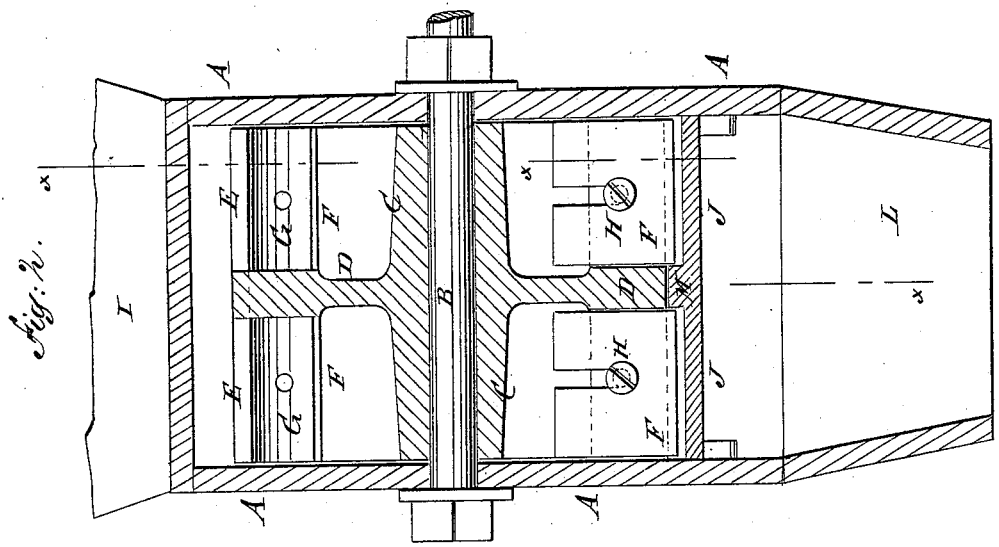
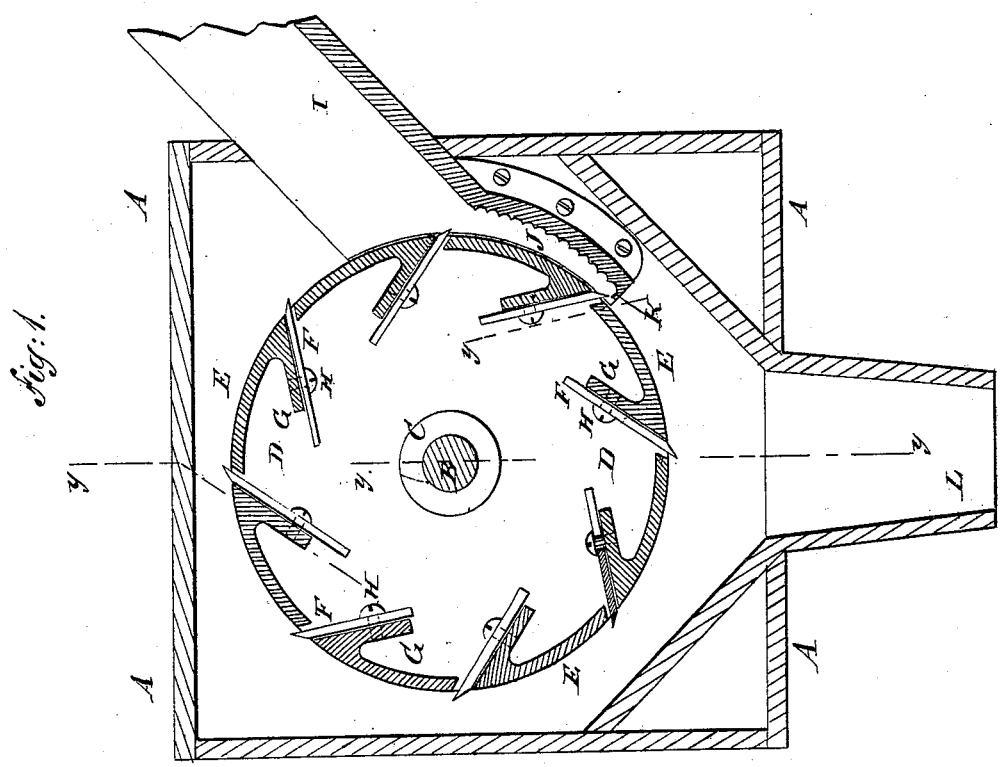
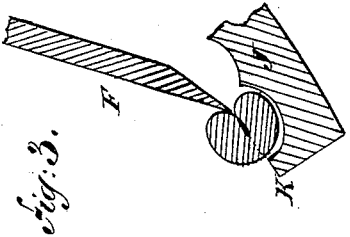
WITNESSES:
INVENTOR:
J. W. Smith
BY Munn & Co.
ATTORNEYS.

UNITED STATES PATENT OFFICE.

JAMES WILLARD SMITH, OF NEW YORK, N. Y.

APPARATUS FOR PREPARING WHEAT FOR GRINDING.

SPECIFICATION forming part of Letters Patent No. 242,387, dated May 31, 1881.

Application filed March 22, 1881. (No model.)

*To all whom it may concern:*

Be it known that I, JAMES WILLARD SMITH, of the city, county, and State of New York, have invented a new and useful Improvement in Mechanism for Preparing Wheat for Grinding, of which the following is a specification.

Figure 1 is a sectional side elevation of my improved machine, taken through the line $x\ x$, Fig. 2. Fig. 2 is a sectional front elevation of the same, taken through the line $y\ y\ y\ y$, Fig. 1. Fig. 3 is an enlarged sectional view, showing the manner in which the knives operate upon the kernels.

Similar letters of reference indicate corresponding parts.

The object of this invention is to remove the dust, fuzz, and other impurities from the creases in the kernels of the wheat, and also to prevent the bran from being pulverized and mixed with the flour.

A represents a casing, of a size depending upon the amount of wheat to be operated upon at a time.

B is a revolving shaft which passes through the casing A.

To the shaft B is attached a hub, C, provided at its center with spokes or a flange, D, carrying a cylindrical shell, E, which is slotted longitudinally from its ends to the central flange or spokes, D, to receive a series of knives, F. The knives F rest against inclined lugs, brackets, or flanges G, formed upon or attached to the inner surface of the shell E at the rear sides of its knife-slots. The knives F are slotted transversely to receive the screws or bolts H, that secure the said knives to the lugs, brackets, or flanges G, so that the said knives can be moved forward as they become worn. The knives F are thus arranged like plane-irons, and their cutting-edges project beyond the outer surface of the shell E for a distance equal to about half the thickness of a kernel of wheat.

The wheat is fed into the machine through a chute, I, which passes in through an aperture in the rear wall of the casing A. The lower ends of the sides of the chute I are concaved, to fit against the end parts of the shell E.

The lower part, J, of the bottom of the chute I is curved, as shown in Fig. 1, so as gradually to approach the shell E, and upon the lower end of the said part J is formed a lip, K, which projects to a height equal to about half the thickness of a kernel of wheat, and its top is at such a distance from the shell E that the edges of the knives F will just clear the lip K, as shown in Fig. 1.

The upper surface of the curved part of the bottom of the chute I is corrugated, as shown in Fig. 1, to cause the kernels of wheat as they roll down the chute to take a horizontal position against the lip K, so that they will be cut longitudinally by the knives F.

With this construction the kernels will be cut longitudinally in such a manner as to open the creases in the said kernels and liberate therefrom the dust and fuzz.

The split kernels escape from the machine through the discharge-spout L.

Upon the curved part of the bottom of the chute I is formed a rib, M, which is concaved to fit against the shell E opposite the spokes or flange D, and between the adjacent ends of the knives F, as shown in Fig. 2, to prevent any kernels from passing through the machine without being operated upon by the said knives F.

In applying my invention to practical use the wheat is first passed through an ordinary cleaning-machine in the same manner as for grinding. The wheat is then passed through the machine hereinbefore described, by which the kernels are cut longitudinally, so as to open the creases of the kernels. The cut grain is then passed through an ordinary brush-machine to remove the dust, fuzz, and other impurities liberated from the creases of the kernels. The cut kernels are then ground or crushed between stones or rollers to reduce them to flour.

By this process the dust, fuzz, and other impurities confined in the creases of the kernels are removed before any flour is formed. The cut kernels of wheat thus prepared are reduced to flour with less pressure and friction than when ground in the ordinary manner, and consequently the bran will not be ground or pulverized and the fine powder thus formed mixed with the flour to discolor it, so that almost the entire product of the wheat will be made into the finest quality of flour.

If desired, the cut kernels of wheat before being passed through the brush-machine may be passed through a bolt or screen to take out the small quantity of seminola or sand-like flour that may have been formed by the cutting operation. The cut kernels may then, if desired, be passed a second time through the cutting-machine to reduce the pieces to a nearly uniform size.

Having thus fully described my invention, I claim as new and desire to secure by Letters Patent—

The combination, with a revolving cylinder, E, of the knives F, projecting therethrough, and the horizontally corrugated concave J, having lip K at the lower end, as and for the purpose specified.

J. WILLARD SMITH.

Witnesses:
JAMES T. GRAHAM,
C. SEDGWICK.